Oct. 6, 1925.  
T. J. FAY  
1,556,211  
VEHICLE SUSPENSION AND STABILIZER  
Filed Jan. 24, 1922
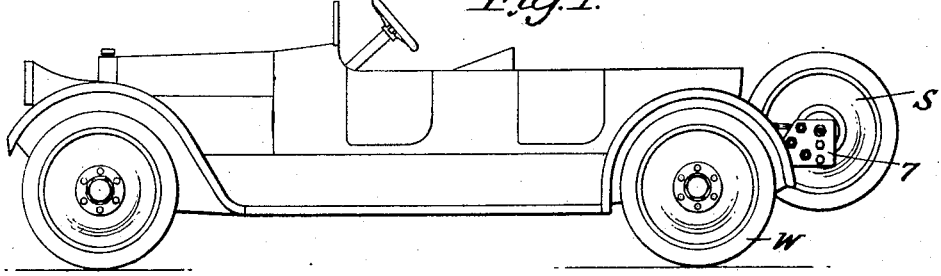
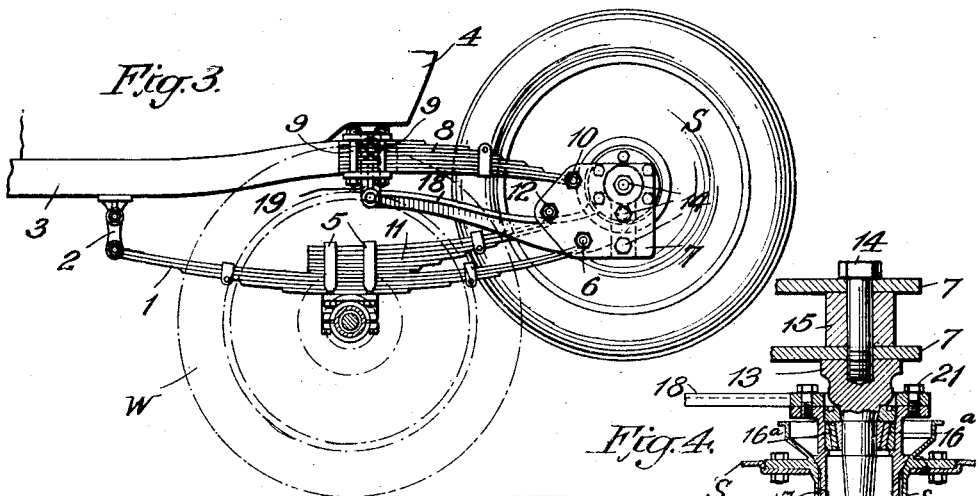
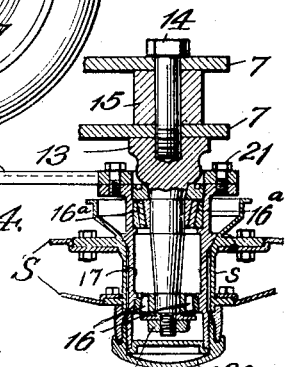
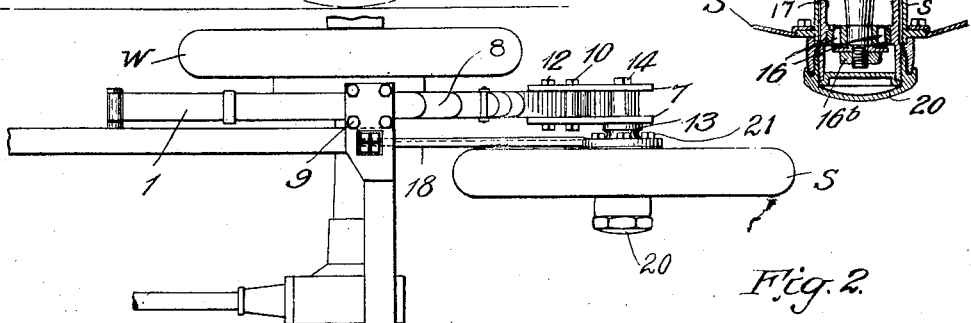
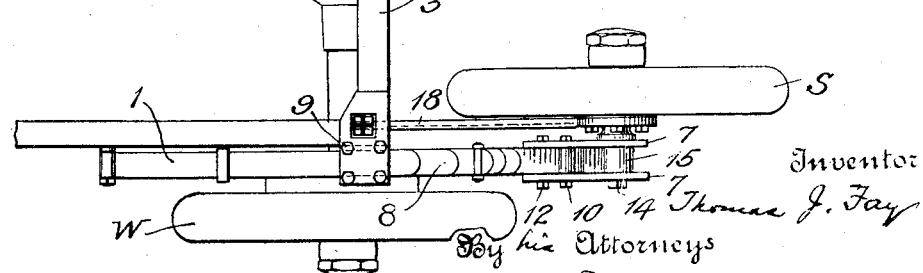

Patented Oct. 6, 1925.

1,556,211

UNITED STATES PATENT OFFICE.

THOMAS J. FAY, OF BROOKLYN, NEW YORK.

VEHICLE SUSPENSION AND STABILIZER.

Application filed January 24, 1922. Serial No. 531,325.

*To all whom it may concern:*

Be it known that I, THOMAS J. FAY, a citizen of the United States, residing at Brooklyn, in the county of Kings and State of New York, have invented certain new and useful Improvements in Vehicle Suspensions and Stabilizers, of which the following is a full, clear, and exact description.

This invention relates to motor vehicles and has for an object to provide an improved resilient suspension between the body and axle with which the jolts, jounces and shocks due to pronounced unevenness of the roadway over which the vehicle is passing will be counteracted or resisted without preventing the effective absorption by the suspension of the small jars or shocks that are due to minor variations in the surface of the roadway. A further object is to provide a suspension in which the body may be adjusted toward and from the axle. A further object is to provide an improved stabilizer which may be embodied in the present vehicles without considerable changes in their construction and which is effective and relatively simple and inexpensive. A further object is to provide a stabilizing device which is also effective as a bumper to prevent injury to the vehicle in case of rear end collisions and which serves as a support for spare wheels of the vehicle. Other objects and advantages will be apparent from the following description of an embodiment of the invention and the novel features of the invention will be particularly pointed out in claims.

In the accompanying drawing:

Fig. 1 is a side elevation of a vehicle in which my improved suspension and stabilizer has been embodied;

Fig. 2 is a plan of the rear end of the chassis of the same;

Fig. 3 is a sectional elevation of the same; and

Fig. 4 is a sectional plan of the wheel and its support.

In the illustrated embodiment of the invention, a bow-shaped leaf spring 1 is provided, by means of a link 2 at one end thereof, with an articulated connection to the chassis frame 3 which supports a suitable body 4. The spring at a point intermediate of its length is fixed, by means of straps 5, to a sleeve oscillatable upon the rear axle and at its other end is provided with an articulated connection 6 between a pair of spaced plates forming a gathering member 7. A half leaf spring 8 is secured to the rear end of the chassis frame in any suitable manner, such as by bolts 9 and extends rearwardly of the chassis frame, the free end thereof having an articulated connection 10 between the gathering plates of the member 7. A second half spring 11 is adjustably clamped to the bow spring 1 adjacent the rear axle in any suitable manner, such as by the straps 5 which pass over both springs 11 and 1. The spring 11 is provided at its other end with an articulated connection 12 between the gathering plates of the member 7 at a point forwardly of the hinged connections 6 and 10. The spring 8 preferably has a length such that the hinged connection 10 normally will be slightly forwardly of the hinged connection 6 and to the rear of the hinged connection 12. When the rear driving wheels W are rotated by the motive power of the vehicle the lower or bow spring 1 will be carried forwardly and exert a pull upon the gathering member 7 which in turn pushes forwardly upon the spring 8 so that the rear axle pulls the vehicle instead of pushes it. If desired the link 2 may be omitted and a single hinged connection between the spring 1 and the chassis frame substituted therefor. The rear end of the spring 1 and the half spring 11 are given an initial curvature such that when strapped together adjacent the axle, and the free ends are connected to the gathering member, the free ends must be sprung apart and stressed to a desired extent in which condition they are connected to the gathering member. The rear end of the spring 1 and the half spring 11 are, therefore, less resilient than the forward end of the bow spring and the half spring 8, so that the flexure during normal use will be largely in the spring 8 and the forward end of the spring 1. Under the major shocks to which the axle is subjected the rear end of the spring 1 will be flexed prior to the spring 11 since the flexure is proportionate to the cube of the length of the arm and the rear end of the spring 1 has a greater length than the spring 11. Under still greater shocks the spring 11 will also yield and resist relative movement between the body and the axle. The springs 1 and 11, however, are not effective until the flexing stress approximately equals the pre-sprung stress between the ends of the springs 1 and 11. The minor relative movements between the body and axle are, therefore, absorbed by the forward end of the spring 1 and the spring 8, and the major shocks are absorbed by the same and also by the rear end of the spring 1 and the spring 11.

To adjust the clearance between the body and the axle, that is, adjust the body and axle together or apart, it is merely necessary to temporarily support the chassis frame, loosen the straps 5 and shift the spring 11 slightly to the rear if it is desired to separate the body and axle, after which the straps 5 may be tightened to hold the parts in the newly adjusted positions. During the rearward movement of the spring 11 the gathering member will be rotated slightly to carry the hinged connection 10 about the hinged connection 6 and thus increase the distance between the body and the axle. To bring the body and axle nearer together the chassis frame is given a temporary support, the straps 5 are loosened and the spring 11 adjusted forwardly to the desired amount, the hinged connection 10 being shifted forwardly about the hinged connection 6 which brings the body nearer to the axle, after which the straps 5 are again tightened. The hinged connections 6, 10 and 12 are each conveniently formed by a bolt which passes through an eye in the end of the spring and the plates of the gathering member.

A bearing element 13 is secured to a side of the gathering member by means of bolts 14 which pass through both of the plates of the gathering member and are threaded into the bearing element 13, bushings 15 being placed upon the bolts 14 between the plates of the gathering member to afford rigidity. The bearing element may be very similar to the steering knuckle of the vehicle. Bearings 16 and 16$^a$ support the hub 17 of a spare wheel S upon the bearing element in a somewhat similar manner to that by which the wheels are supported upon the bearing knuckles of the front axle. The inner bearing 16$^a$ comprises a friction generating conical ring frustrum of woven asbestos, copper fabric, red fiber, or other resistant material, and the hub is held upon the bearings by hub nut 16$^b$, which by its adjustment tightens or loosens the bearing and thus varies the resistance to rotation of the hub. The bearing elements extend toward one another, crosswise of the vehicle, so that the spare wheels will be carried in vertical positions and parallel with the wheels in use upon the vehicle, and out of contact with the roadway. It will be observed that each spare wheel is in effect carried by the rear end of the lower section of the suspension (springs 1 and 11) having a fulcrum at the rear axle and a point of application of the power to the chassis at its other end through the link 2. Thus, the spare wheels act as counter weights acting through the lever formed by the lower section of the suspension to press upwardly upon the chassis and tend to resist relative approach of the body and axle toward one another, which action provides an additional stabilizing feature. The spare wheels because of their weight, also having considerable inertia, and therefore, through the lever-like action upon the body this inertia tends to resist sudden movements of the body toward the axle. So too, the friction between the friction member 16$^a$ and the hub 17, adjustable through changing the position of the hub nut 16$^b$, affords means of varying the resistance to rotation of the spare wheel S, thereby making the said spare wheel a more effective device in resisting relative motion between the body and axle.

A crank arm 18 is secured in a suitable manner to the hub of each spare wheel and extends forwardly beneath the rear end of the chassis frame, the end of the crank arm having a pivotal connection to one end of a link 19 which is in turn pivotally connected at its other end to the chassis frame. Thus, during the relative vertical movements between the body and axle, the crank connection from the wheels S to the body or chassis frame will impart to the spare wheels a rotation in one direction or the other, depending upon whether or not the body and axle are approaching or receding from one another. The spare wheels, because of their weight, have considerable inertia which must be overcome in setting them into rotation or in stopping them after having been once placed in rotation and this inertia constantly tends to resist sudden movements between the body and axle in either direction and also tends to resist sudden changes in the direction of such movements. The result is that the rotative inertia of the spare wheels very considerably counteracts and neutralizes the shocks or jars which are imparted to the axle as the wheels pass over the major variations in the surface of the roadway.

The spare wheels carry the usual pneumatic tires which have considerable resiliency and when mounted behind the vehicle in the manner described, they act as bumpers to absorb the shocks in rear end collisions between the vehicle and a following vehicle. The spare tire carriers or wheels support the tires so that they are slightly spaced from the chassis frame in a direction lengthwise of the vehicle. Therefore the collision shocks if minor in character, will be absorbed or taken up by the tire and by the suspension device. In cases of severe shocks of collision, the gathering members will rotate about one of the articulated connections to the suspension members and the suspension members will flex and separate to permit the tire to engage with the chassis frame. The chassis frame, tire and carrier will then directly absorb or take up the collision shocks.

Each of the wheels S is detachably mounted upon its hub by means of a central tubular sleeve *s* which slides axially upon the hub when applied to or removed therefrom. The hub and sleeve have cooperating serrations or key connections so as to cause them to rotate together when in telescopic relation, and a removable cap 20 threaded upon the end of the hub and abutting against the sleeve *s* secures the wheel upon the hub. The connection between each crank arm 18 and its wheel may be accomplished by providing one end of the crank arm with an annular ring which is clamped to the inner end of the hub by cap screws 21. All of the wheels may thus be interchanged upon all of the hubs, so that the two spare wheels carried as a part of the stabilizer may be used to replace any of the wheels upon the axles in cases of tire trouble, or if for any other reason, a change is desired.

In the operation of the device, as the vehicle moves over the roadway, the irregularities in the latter will cause relative movements between the body part and the running gear and these relative movements are resisted by the inertia of the spare wheels applied through the lower spring 1 as a lever and through the crank connection to the body part. In addition, the spare wheels, through their weight and their fulcrum upon the axle, exert an upward pressure upon the body part and tend to resist the tendency of the body part to follow the axle when ruts are encountered and the wheels enter the ruts. The hub nut 16$^b$ may be adjusted to vary the friction of the spare wheels upon their hubs and thus the additional and variable resistance to relative movements between the body part and running gear is provided. The spring 8 and the forward part of the spring 1 absorb the minor shocks encountered as the vehicle is operated and the springs 11 and the rear end of spring 1 come into play only when the shocks exceed a given amount which is proportional to the pre-sprung stress between the rear end of the spring 1 and the spring 2. The spring 11 and the rear end of spring 1 together form, in effect, a rigid beam during the operation under ordinary shocks, and therefore, the weight of the wheels during the shocks will cause a flexure of the spring 1. These features very materially assist in stabilizing the movement of the body part and provide superior riding qualities for the vehicle. In case of tire trouble, the wheels W may be removed from their hubs and interchanged with the spare wheels S with their inflated tires in a very simple manner. The spare wheels, with their inflated tires, also act as bumpers and prevent injury from collisions with following vehicles.

It will be obvious that various changes in the details and arrangements herein described and illustrated as one embodiment of the invention may be made by those skilled in the art within the principle and scope of the invention.

I claim:

1. In a vehicle, a suspension between a chassis frame and an axle, comprising a gathering member, a long spring having an articulated connection at one end to the chassis frame, a bearing connection at an intermediate point to the axle, and an articulated connection at its other end to the gathering member, a leaf spring fixed at one end to the chassis frame and hinged at its other end to the gathering member, a second leaf spring rigidly attached at one end to an intermediate part of the long spring and having an articulated connection at its other end to the gathering member, the long and second leaf springs having their ends which are connected to the gathering member sprung apart to a desired extent in making the connections to the gathering member.

2. In a vehicle, a suspension between a chassis frame and an axle, comprising a gathering member, a long spring having an articulated connection at one end to the chassis frame, a bearing connection at an intermediate point to the axle, and an articulated connection at its other end to the gathering member, a leaf spring fixed at one end to the chassis frame and hinged at its other end to the gathering member, a second leaf spring secured at one end to an intermediate part of the long spring for adjustment thereon in an endwise direction and having at its other end an articulated connection to the gathering member, the long and second leaf springs having their ends which are connected to the gathering member sprung apart to a desired extent in making the connections to the gathering member.

3. In a vehicle, a suspension between a chassis frame and an axle, comprising a gathering member, a long spring having an articulated connection at one end to the chassis frame, a bearing connection at an intermediate point to the axle, and an articulated connection at its other end to the gathering member, a leaf spring fixed at one end to the chassis frame and hinged at its other end to the gathering member at a point thereto between the chassis frame and the connection of the long spring to the gathering member, a second leaf spring rigidly secured at one end to an intermediate part of the long spring and having an articulated connection at its other end to the gathering member at a point between the other articulated connections thereto and the chassis frame, the long and second leaf springs having their ends which are connected to the gathering member sprung apart to a desired extent in making the connections to the gathering member.

4. In a vehicle, a suspension between a chassis frame and an axle, comprising a gathering member, a long spring having an articulated connection at one end to the chassis frame, a connection at an intermediate point to the axle, and an articulated connection at its other end to the gathering member, a leaf spring fixed at one end to the chassis frame and hinged at its other end to the gathering member at a point thereto between the chassis frame and the connection of the long spring to the gathering member, a second leaf spring rigidly secured at one end to an intermediate part of the long spring for adjustment thereon in an endwise direction and having at its other end an articulated connection to the gathering member, at a point between the other articulated connections thereto and the chassis frame, the adjustment of the second leaf spring operating to rotate the gathering member and cause a relative approaching or separating movement between the chassis frame and axle.

5. In a vehicle having a chassis frame and axle, spring elements secured to the frame and axle, a gathering member to which the rearwardly extending ends of the spring elements have articulated connections, a bearing device carried by the member, an inertia element rotatably carried by the bearing device, and means for causing a rotation of the inertia element upon relative movement between the chassis frame and axle.

6. In a vehicle having a chassis frame and axle, spring elements secured to the frame and axle, a gathering member to which the rearwardly extending ends of the spring elements are connected, a bearing device carried by the member, an inertia element rotatably carried by the bearing device, and crank means connecting the inertia element to the chassis frame whereby upon movements of the chassis frame relatively to the axle, the inertia element will be oscillated and the sudden changes in movement of the chassis frame retarded by the inertia of the inertia element.

7. In a vehicle having a chassis frame and axle, spring elements secured to the frame and axle, a gathering member to which the rearwardly extending ends of the spring elements are connected, a bearing device carried by the member and extending transversely of the vehicle, a spare vehicle wheel rotatably carried by the bearing device, a crank device connecting the spare wheel to the chassis frame the latter in moving toward or from the axle will rotate the spare wheel and be retarded by the inertia of the wheel.

8. In a vehicle having a chassis frame and axle, a resilient suspension device between each side of the frame and the axle, a bearing device carried by each of the suspension devices at opposite sides of the chassis frame and extending transversely of the frame, spare wheels rotatably carried by the bearing devices, and connections between the wheels and the chassis frame for rotating the wheels when the frame and axle approach one another or separate, whereby the movements of the frame relative to the axle will be retarded by the inertia of the spare wheels.

9. In a vehicle having a chassis frame and axle, a resilient suspension device between each side of the frame and the axle, a bearing device carried by each of the suspension devices at opposite sides of the chassis frame and extending transversely of the frame, spare wheels with resilient tires thereon rotatably carried by the bearing devices, and connections between the wheels and the chassis frame for rotating the wheels when the frame and axle approach one another or separate, whereby the movements of the frame relative to the axle will be retarded by the inertia of the spare wheels, the resilient tires acting as bumpers in cases of rear end collisions with a following vehicle.

10. In a vehicle having a chassis frame and a rear axle, a suspension between each side of the frame and the axle comprising a spring having at its forward end an articulated connection to the frame, a connection at an intermediate point to the axle, means connecting the rear end of the spring to the frame, a supporting element carried by the rear end of each suspension, and a spare vehicle wheel removably carried by each supporting element.

11. In a vehicle having a chassis frame and axle, suspension elements secured to the frame and axle, a member to which the extending ends of the elements are connected, an element rotatably carried by said member and having inherent inertia, and means for causing rotary movement of the inertia element upon a relative movement between the chassis frame and axle whereby said relative movement will be modified by the inertia of said inertia element.

12. In a vehicle having a chassis frame and axle, a lower suspension element connected at one end to the frame and having fulcrum connection at an intermediate point to the axle, an upper resilient suspension member extending from the chassis frame, a member connecting the upper suspension member and the other end of the lower member, the lower element being comparatively rigid between the member and the axle connection, and comparatively resilient between the axle connection and the frame connections, and a weight carried by the said member and acting through the lower suspension member as a lever to resist movements of the chassis frame relatively to the axle.

13. In a vehicle having a chassis frame and axle, a lower suspension element connected at one end to the frame and having a fulcrum connection at an intermediate point to the axle, an upper suspension member extending from the chassis frame, a member connecting the upper suspension member and the other end of the lower member, an inertia element carried by said member and acting through the lower suspension member as a lever to resist movements of the chassis frame relatively to the axle, and a connection between the inertia element and the frame for causing an additional movement of the inertia element when the frame moves relatively to the axle.

14. In a vehicle having a chassis frame and axle, suspension elements secured to the frame and axle, a member to which the extending ends of the elements are connected, an element having inherent inertia carried by said member, means for causing movement of the inertia element upon a relative movement between the chassis frame and axle, whereby said relative movement will be modified by the inertia of said element, and frictional means for resisting the movement of the inertia element.

15. In a vehicle having a chassis frame and axle, suspension elements secured to the frame and axle, a member to which the extending ends of the elements are connected, an element having inherent inertia carried by said member, means for causing movement of the inertia element upon a relative movement between the chassis frame and axle, whereby said relative movement will be modified by the inertia of said element, and variable frictional means for resisting the movement of the inertia element.

16. In a vehicle having a chassis frame and axle, a lower suspension element connected at one end to the frame and having fulcrum connection at an intermediate point to the axle, an upper suspension member extending from the chassis frame, a member connecting the upper suspension member and the other end of the lower member, a weight rotatably carried by the said member and acting through the lower suspension member as a lever to resist movements of the chassis frame relatively to the axle and a connection between the weight and the chassis frame for causing a rotation of the weight during relative movements of the frame and axle.

17. In a vehicle having a chassis frame and axle, a lower suspension element connected at one end to the frame and having fulcrum connection at an intermediate point to the axle, an upper suspension member extending from the chassis frame, a member connecting the upper suspension member and the other end of the lower member, a weight rotatably carried by the said member and acting through the lower suspension member as a lever to resist movements of the chassis frame relatively to the axle, a connection between the weight and the chassis frame for causing a rotation of the weight during relative movements of the frame and axle and frictional means for resisting rotation of the weight.

18. In a vehicle having a chassis frame and axle, a lower suspension element connected at one end to the frame and having fulcrum connection at an intermediate point to the axle, an upper suspension member extending from the chassis frame, a member connecting the upper suspension member and the other end of the lower member, a weight rotatably carried by the said member and acting through the lower suspension member as a lever to resist movements of the chassis frame relatively to the axle, a connection between the weight and the chassis frame for causing a rotation of the weight during relative movements of the frame and axle and variable frictional means for resisting rotation of the weight.

19. In a vehicle having a chassis frame part and an axle part, a suspension device between the said parts, an element having inherent inertia carried by said device and connected to one of said parts for operation thereby whereby relative movement between said parts will be resisted by the inertia of said element, and frictional means for resisting operation of the inertia element.

20. In a vehicle having a chassis frame part and an axle part, a suspension device between the said parts, an element having inherent inertia carried by said device and connected to one of said parts for operation thereby whereby relative movement between said parts will be resisted by the inertia of said element, and variable frictional means for resisting operation of the inertia element.

21. In a vehicle having a chassis frame and an axle, a lower suspension element connected at one end to the frame and having a fulcrum connection at an intermediate point to the axle, an upper suspension member extending from the chassis frame, means for connecting the end of the upper member to the other end of the lower member, the portion of the lower member between the connections of the same to the frame and axle being resilient and the other portion comparatively rigid, a bearing element carried by the said connecting means, an inertia element rotatably carried by the bearing element, and a connection between said element and the chassis frame whereby relative movement between the frame and axle will be resisted by rotation of the element.

22. In a vehicle having a chassis frame and an axle, a lower suspension element connected at one end to the frame and having a fulcrum connection at an intermediate point to the axle, an upper suspension member extending from the chassis frame, means for connecting the end of the upper member to the other end of the lower member, the portion of the lower member between the connections of the same to the frame and axle being resilient and the other portion comparatively rigid, a bearing element carried by the said connecting means, an inertia element rotatably carried by the bearing element, a connection between said element and the chassis frame whereby relative movement between the frame and axle will be resisted by rotation of the element, and frictional means between the inertia element and its bearing element for resisting rotation of the inertia element.

23. The vehicle construction substantially as set forth in claim 22 in which the frictional means is adjustable to vary the frictional resistance to rotation.

24. In a vehicle having a chassis frame and axle, a lower suspension element connected at one end to the frame and having fulcrum connection at an intermediate point to the axle, an upper suspension member extending from the chassis frame, a member connecting the upper suspension member and the other end of the lower member, and a weight carried by the said member and acting through the lower suspension member as a lever to resist movements of the chassis frame relatively to the axle, said weight comprising a spare vehicle wheel which is removably carried by the said member so as to be interchangeable with the vehicle wheels on the axle.

25. The vehicle construction substantially as set forth in claim 13 in which the inertia element comprises a spare vehicle wheel which is removably carried by the said member so as to be interchangeable with the vehicle wheels on the axle.

26. The vehicle construction substantially as set forth in claim 14 in which the inertia element comprises a spare vehicle wheel which is removably carried by the said member so as to be interchangeable with the vehicle wheels on the axle.

27. The vehicle construction substantially as set forth in claim 15 in which the inertia element comprises a spare vehicle wheel which is removably carried by the said member so as to be interchangeable with the vehicle wheels on the axle.

28. The vehicle construction substantially as set forth in claim 16 in which the weight comprises a spare vehicle wheel which is removably carried by the said member so as to be interchangeable with the vehicle wheels on the axle.

29. The vehicle construction substantially as set forth in claim 17 in which the weight comprises a spare vehicle wheel which is removably carried by the said member so as to be interchangeable with the vehicle wheels on the axle.

30. The vehicle construction substantially as set forth in claim 18 in which the weight comprises a spare vehicle wheel which is removably carried by the said member so as to be interchangeable with the vehicle wheels on the axle.

31. In a vehicle having a chassis frame part and an axle part, a suspension device between the said parts, and an intertia element carried by said device and connected to one of said parts for operation thereby, whereby relative movement between said parts will be resisted by the intertia of said element, said inertia element comprising a spare vehicle wheel which is removably carried by said device so as to be interchangeable with the vehicle wheels on the axle.

32. The vehicle construction substantially as set forth in claim 19 in which the inertia element comprises a spare vehicle wheel which is removably carried by said device so as to be interchangeable with the vehicle wheels on the axle.

33. The vehicle construction substantially as set forth in claim 20 in which the inertia element comprises a spare vehicle wheel which is removably carried by said device so as to be interchangeable with the vehicle wheels on the axle.

34. In a vehicle having a chassis frame and an axle, a lower suspension element connected at one end to the frame and having a fulcrum connection at an intermediate point to the axle, an upper suspension member extending from the chassis frame, means for connecting the end of the upper member to the other end of the lower member, the portion of the lower member between the connections of the same to the frame and axle being resilient and the other portion more rigid, a bearing element carried by the said connecting means, a wheel hub rotatably carried by the bearing element, a wheel detachably mounted on said hub, and a connection between said hub and the frame whereby relative movement between the frame and axle will be resisted by the inertia of the wheel.

35. The vehicle construction substantially as set forth in claim 34 in which the bearing element is provided with a friction cone engaging with the hub to frictionally resist rotation of the hub on the element, and means for varying the pressure of the hub on said cone.

36. In a vehicle having a chassis frame and axle, a group of suspension elements interposed between the axle and frame at each side of the vehicle, extending in a direction lengthwise of the vehicle, and connected at their outer ends, a pin carried by the connection between the outer ends of each group of connected elements and extending in a direction crosswise of the length of the vehicle, the elements connected to the frame being flexible and resilient, a pneumatic tire for each group of suspension elements, a carrier for each tire mounted on said pin, so as to present the tire as a bumper, the periphery of the tire being normally spaced a short distance from the frame so that the minor collision shocks are taken up by the tire and suspension, and the major shocks by the tire and frame as the suspension elements yield to allow the tire to engage the frame.

37. In a vehicle having a chassis frame and axle, suspension elements interposed between the frame and axle and extending in a direction lengthwise of the vehicle, a gathering member to which the outer ends of the elements are articularly connected at vertically spaced points, a tire carrier supported upon the gathering member with its axis extending transversely to the length of the vehicle, a pneumatic tire supported upon the carrier with its axis parallel with the axis of the carrier, and with its periphery presented as a bumper, the tire periphery being normally spaced a short distance from the frame so that the minor shocks of collision upon the tire will be taken up by the tire and suspension elements, and the major shocks by the tire and frame as the gathering member rotates about one of the articulated connections to allow the tire to engage the frame.

In witness whereof, I hereunto subscribe my signature.

THOMAS J. FAY.